(12) United States Patent
Baldemair et al.

(10) Patent No.: US 8,781,484 B2
(45) Date of Patent: Jul. 15, 2014

(54) METHODS AND DEVICES FOR COMMUNICATING OVER A RADIO CHANNEL

(75) Inventors: Robert Baldemair, Solna (SE); Richard Abrahamsson, Knivsta (SE); David Astely, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 21 days.

(21) Appl. No.: 12/742,750

(22) PCT Filed: Jul. 2, 2008

(86) PCT No.: PCT/SE2008/050826
§ 371 (c)(1),
(2), (4) Date: May 13, 2010

(87) PCT Pub. No.: WO2009/078785
PCT Pub. Date: Jun. 25, 2009

(65) Prior Publication Data
US 2010/0248732 A1    Sep. 30, 2010

Related U.S. Application Data

(60) Provisional application No. 61/013,788, filed on Dec. 14, 2007.

(51) Int. Cl.
*H04W 72/00* (2009.01)
(52) U.S. Cl.
USPC .......................................................... 455/450

(58) Field of Classification Search
USPC ......... 370/344, 208, 329, 203, 342, 336, 328; 375/130, 136, 267, 260, 295; 455/447, 455/525
See application file for complete search history.

(56) References Cited

U.S. PATENT DOCUMENTS 7,778,151 B2 *  8/2010  Bertrand et al. .............. 370/208
2007/0230600 A1  10/2007  Bertrand et al.
(Continued)

FOREIGN PATENT DOCUMENTS

GB          2394623 A        4/2004
WO          2007052971 A1    5/2007
WO          WO2008129797 A1  10/2008

OTHER PUBLICATIONS

LGE, "RACH Sequence Extension Methods for Large Cell Deployment," R1-062306, 3GPP TSG RAN1 LTE WG1 Meeting #46, Tallinn, Estonia, Aug. 28-Sep. 1, 2006, XP002422896, pp. 1-7.
LG Electronics, "RACH Design Issues of Large Cell Deployment," R1-062557, 3GPP TSG RAN WG1 Meeting #46bis, Seoul, Korea, Oct. 9-13, 2006, XP002466661, pp. 1-6.

(Continued)

*Primary Examiner* — Kiet Doan

(57) ABSTRACT

The invention relates to methods and communication devices for transmitting data on a radio channel comprising the steps of determining a first preamble format to be used in a cell of the second communication device, determining a basic cyclic shift value from a set of basic cyclic shift values, the set is selected based on the preamble format, and transmitting data comprising indication of the determined first preamble format and a basic cyclic shift value pointer indicating the basic cyclic shift value in the set of basic cyclic shift values.

17 Claims, 9 Drawing Sheets

(56) References Cited

U.S. PATENT DOCUMENTS

| | | | |
|---|---|---|---|
| 2007/0253465 A1* | 11/2007 | Muharemovic et al. | 375/130 |
| 2008/0080472 A1 | 4/2008 | Bertrand et al. | |
| 2008/0123616 A1* | 5/2008 | Lee | 370/344 |
| 2008/0167042 A1 | 7/2008 | Kitazoe | |
| 2008/0235314 A1* | 9/2008 | Lee et al. | 708/426 |
| 2009/0161616 A1 | 6/2009 | Ramesh et al. | |
| 2009/0305693 A1 | 12/2009 | Shimomura et al. | |

OTHER PUBLICATIONS

Ghosh, A., et al., "Random Access Design for UMTS Air-Interface Evolution," Vehicular Technology Conference, 2007, IEEE, XP031092788, pp. 1041-1045.

International Search Report for PCT/SE2008/050826 mailed Oct. 31, 2008.

International Preliminary Report on Patentability for PCT/SE2008/050826 dated Jan. 15, 2010.

* cited by examiner

METHODS AND DEVICES FOR COMMUNICATING OVER A RADIO CHANNEL

TECHNICAL FIELD

The invention relates to methods and communication devices in a communications network, in particular, for transmitting/receiving data on a radio channel.

BACKGROUND

In modern cellular radio systems, the radio network has a strict control on the behavior of a user equipment. Uplink transmission parameters like frequency, timing, and power are regulated via downlink control signaling from a base station to the user equipment, UE.

At power-on or after a long standby time, the UE is not synchronized in the uplink. The UE may derive from the downlink (control) signals an uplink frequency and power estimate. However, a timing estimate is difficult to make since the round-trip propagation delay between the base station and the UE is unknown. So even if UE uplink timing is synchronized to the downlink, it may arrive too late at the base station receiver because of the propagation delays. Therefore, before commencing traffic, the UE has to carry out a Random Access (RA) procedure to the network. After the RA, base station can estimate the timing misalignment of the UE uplink and send a correction message. During the RA, uplink parameters like timing and power are not very accurate. This poses extra challenges to the dimensioning of a RA procedure.

Usually, a Physical Random Access Channel (PRACH) is provided for the UE to request access to the network. An access burst is used which contains a preamble with a specific sequence with good autocorrelation properties. The PRACH can be orthogonal to the traffic channels. For example, in GSM a special PRACH slot is defined.

Because multiple UEs may request access at the same time, collisions may occur between requesting UEs. Therefore, multiple RA preambles have been defined for Evolved UTRAN (E-UTRAN), also called for LTE, Long Term Evolution. A UE performing RA picks randomly a preamble out of a pool and transmits it. The preamble represents a random UE ID which is used by the base station when granting the UE access to the network. The base station receiver may resolve RA attempts performed with different preambles and send a response message to each UE using the corresponding random UE IDs. In case that multiple UEs simultaneously use the same preamble a collision occurs and most likely the RA attempts are not successful since the base station cannot distinguish between the two users with a different random UE ID. In LTE, E-UTRAN, sixty four preambles are provided in each cell. Preambles assigned to adjacent cells are typically different to insure that a RA in one cell does not trigger any RA events in a neighboring cell. Information that must be broadcasted is therefore the set of preambles that can be used for RA in the current cell.

One or multiple RA preambles are derived from a single Zadoff-Chu sequence—in the following also denoted root sequence—by cyclic shifting: Due to the ideal auto correlation function of Zadoff-Chu sequence, multiple mutually orthogonal sequences may be derived from a single root sequence by cyclic shifting one root sequence multiple times the maximum allowed round trip time plus delay spread in time-domain. Since each cyclic shift amount must be at least as large as the maximum round trip time in the cell plus delay spread the number of preamble that can be derived from a single root sequence is cell size dependent and decreases with cell size. In order to support operation in cells with different sizes LTE defines sixteen basic cyclic shift lengths supporting cell sizes from approximately 1.5 km up to approximately 100 km. The value that is used in the current cell is broadcasted.

Not only the length of the basic cyclic shift should be larger than the maximum round trip time plus delay spread, also the cyclic prefix and the guard period—which account for the timing uncertainty in unsynchronized RA—should be larger than the maximum round trip time plus delay spread. LTE FDD, Frequency Division Duplex, currently defines four different RA preamble formats with three different cyclic prefix/guard period length supporting cell sizes of 15 km, 30 km, and 100 km.

The cell size that is supported with a certain RA configuration is therefore limited by
1) the length of the cyclic prefix/guard period and
2) the length of the basic cyclic shift.

In addition to these limitations of course also received energy is crucial, some of the RA preamble formats are therefore longer to increase the energy received in the base station. Currently only one set of basic cyclic shift lengths/values is defined, independent which cyclic prefix/guard period or RA preamble format is used. For example, a preamble format with 100 μs cyclic prefix/guard period supports cell sizes up to 15 km. In this case all basic cyclic shift lengths that support larger cell sizes cannot be efficiently used since a supported cell size is limited by the cyclic prefix and/or the size of the guard time and a basic cyclic shift that is longer than the cyclic prefix is an unnecessary over dimensioning.

SUMMARY

It is an object of embodiments to increase the number of different preambles to be used in a random access process.

Embodiments relate to a method in a second communication device for transmitting data on a radio channel. The method comprises the steps of determining a first preamble format to be used in a cell of the second communication device and determining a basic cyclic shift value from a set of basic cyclic shift values. The set is selected based on the preamble format. The method further comprises the step of transmitting data comprising indication of the determined first preamble format and a basic cyclic shift value pointer indicating the basic cyclic shift value in the set of basic cyclic shift values.

Because of the very short duration of the additional RA preamble in, for example, LTE TDD, an additional table of basic cyclic shifty lengths is introduced and the preamble format is used as selector which set of basic cyclic shift lengths to use. Since the preamble format needs anyway be signaled no additional signaling is required with this method.

Embodiments further relate to a second communication device comprising a control unit arranged to determine a first preamble format to be used in a cell of the second communication device and to determine a basic cyclic shift value from a set of basic cyclic shift values. The set relates to the preamble format. The second communication device further comprises a transmitting arrangement adapted to transmit data comprising indication of the determined first preamble format and a basic cyclic shift value pointer indicating the basic cyclic shift value.

Furthermore, embodiments relate to a method in a first communication device for processing a signal. The method comprises the steps of receiving data from a second communication device on a radio channel and determining a preamble format from the received data. The data comprises an indication of preamble format and a basic cyclic shift value pointer. The method further comprises the step of selecting a basic cyclic shift value in a set of basic cyclic shift values based on the determined preamble format and the basic cyclic shift value pointer indicating the basic cyclic shift value.

In addition, embodiments disclose a first communication device comprising a receiving arrangement adapted to receive data from a second communication device on a radio channel. The data comprises a basic cyclic shift value pointer indicating a basic cyclic shift value and an indication of a first preamble format. The first communication device further comprises a control unit arranged to determine a preamble format to be used in a random access procedure from the indication in the received data and to select a basic cyclic shift value in a set of basic cyclic shift values based on the basic cyclic shift value pointer. The set of basic cyclic shift values is related to the determined preamble format.

BRIEF DESCRIPTION OF THE DRAWINGS

Embodiments will now be described in more detail in relation to the enclosed drawings, in which.

DETAILED DESCRIPTION OF EMBODIMENTS

Figure 1:
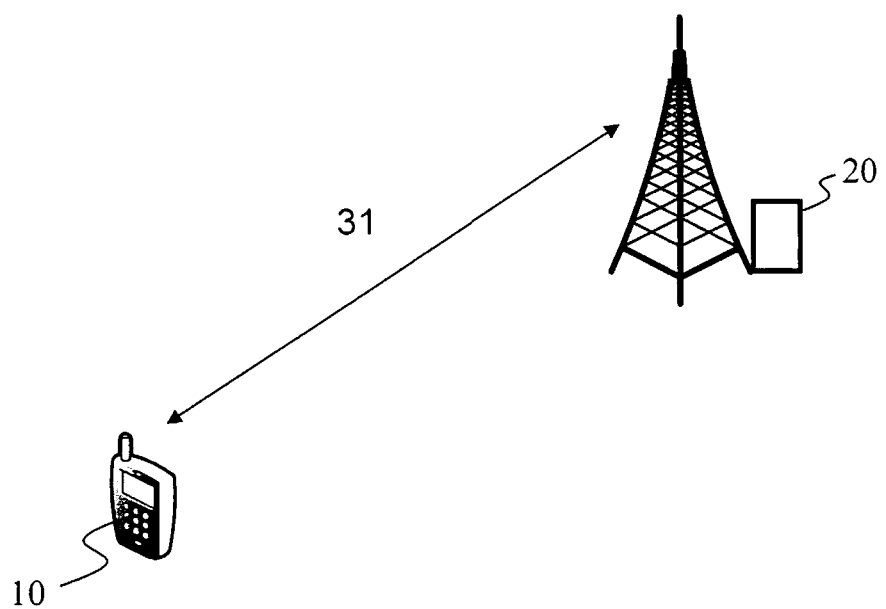
FIG. 1 shows a schematic overview of a first and second communication device communicating.

Embodiments of the present solution will be described more fully hereinafter with reference to the accompanying drawings, in which embodiments of the solution are shown. This solution may, however, be embodied in many different forms and should not be construed as limited to the embodiments set forth herein. Rather, these embodiments are provided so that this disclosure will be thorough and complete, and will fully convey the scope of the solution to those skilled in the art. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present solution is described below with reference to block diagrams and/or flowchart illustrations of methods, apparatus (systems) and/or computer program products according to embodiments of the invention. It is understood that several blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As used herein a communication device may be a wireless communications device. In the context of the invention, the wireless communication device may e.g. be a node in a network such as a base station, UE or the like. User equipment may be a mobile phone, a PDA (Personal Digital Assistant), any other type of portable computer such as laptop computer or the like.

The wireless network between the communication devices may be any network such as an IEEE 802.11 type WLAN, a WiMAX, a HiperLAN, a Bluetooth LAN, or a cellular mobile communications network such as a GPRS network, a third generation WCDMA network, or E-UTRAN. Given the rapid development in communications, there will of course also be future type wireless communications networks with which the present invention may be embodied, but the actual design and function of the network is not of primary concern for the solution.

In FIG. 1 a schematic overview of a first communication device 10 communicating with a second communication device 20 is shown. The communication is performed over a first interface 31 such as an air interface or the like. In the illustrated example, the first communication device 10 is a user equipment, such as a mobile phone, a PDA or the like and the second communication device 20 is a base station, such as an eNobeB, NodeB, RBS or the like.

The second communication device 20 sets up and transmits random access, RA, configurations in order for the first communication device 10 to perform a random access process. The RA configuration comprises preamble format, basic cyclic shift length and the like.

A high granularity of basic cyclic shift lengths is desirable since it maximizes the number of preambles that can be derived from a single root sequence.

Requiring less root sequences in a cell is preferable since 1) different root sequences are not orthogonal creating interference and 2) the detection of multiple root sequences increases complexity.

The size of the guard time is to be chosen in accordance with the cell radius. Choosing it too large will increase complexity and overhead, whereas choosing it too small will limit the cell range.

LTE defines a 4 bit signaling to indicate which basic cyclic shift length is used in the cell. In the following we call the information conveyed by these 4 bits the basic cyclic shift value pointer. This pointer may address entries in sets consisting of 16 values.

It is now proposed to define multiple sets of basic cyclic shift values. With the current signaling each of these tables may have 16 or less entries. The interpretation which set of basic cyclic shift values to use is given by the RA preamble format or the length of the cyclic prefix. Since the RA preamble format is anyway signaled this does not increase signaling amount.

Further, for LTE TDD, Time Division Duplex, in other embodiments, the size of the guard time may be derived, for example, by determining the RA transmission timing, from the basic cyclic shift value as well as the preamble format.

Reusing the same basic cyclic lengths as for the other preambles—which are designed for substantially larger cells—leads to more root sequences in a cell. This implies higher interference and detection complexity.

LTE currently defines a single set of basic cyclic shift values with maximum cell sizes, ignoring for simplicity delay spread but just considering round trip time, of [1.9 2.1 2.6 3.1 3.7 4.6 5.4 6.6 8.4 10.9 13.3 17.0 23.9 39.9 59.9 120.0] km. Expressed in time these shifts are [12.4 14.3 17.2 21.0 24.8 30.5 36.2 43.9 56.3 72.5 88.7 113.5 159.2 266.0 399.5 0] µs.

On the other side LTE defines three cyclic prefix/guard period lengths supporting cell sizes of 15 km, 30 km, and 100 km.

Since only one set of basic cyclic shift values is defined the same set is used independent of the preamble format and its associated cell size limit. This implies for preamble formats with 15 km cell size support that only 11 of the available 16 basic cyclic shift values can be used efficiently. For the preamble format with 30 km cell size support 13 values can be used efficiently.

Using the available 4 bits signaling a higher granularity of basic cyclic shift lengths could be achieved if three different tables would exist, one with the largest basic cyclic shift length supporting 15 km, one with the largest basic cyclic shift length supporting 30 km, and the existing table with cell size support of up to 100 km.

In LTE TDD a new preamble is introduced that spans substantially shorter time duration, currently considered values are 133 µs or 200 µs. Because of this very short duration this preamble is only applicable—due to link budget—for very small cell sizes up to at the most a few km with main target cell sizes, probably around 1 km. Because of the limited link budget it is furthermore important to create as many as possible orthogonal preambles, i.e. by cyclic shifting from a single root sequence. With the currently specified basic cyclic shift values the shortest basic cyclic shift is 12 µs. From a single root sequence (assuming a preamble length of 133 µs) only 133 µs/12 µs=11 preambles can be derived. In total 64/11=6 root sequences are needed to create 64 preambles where most of them are not orthogonal.

It is therefore important to have another set of basic cyclic shift values adopted for these very small cell sizes. The transmitted 4 bits indicating the basic cyclic shift value are now a pointer in the table, which table to use is indicated by the preamble format.

Even though LTE currently defines a common basic cyclic shift value table for the four longer preambles the same principle could of course also be applied here and define multiple tables and use the preamble format to indicate which table to use. The current basic cyclic shift value signaling (4 bits) can address entries in a 16 element long table, however, additional tables may of course be shorter if not all 16 values are needed.

Figure 2:
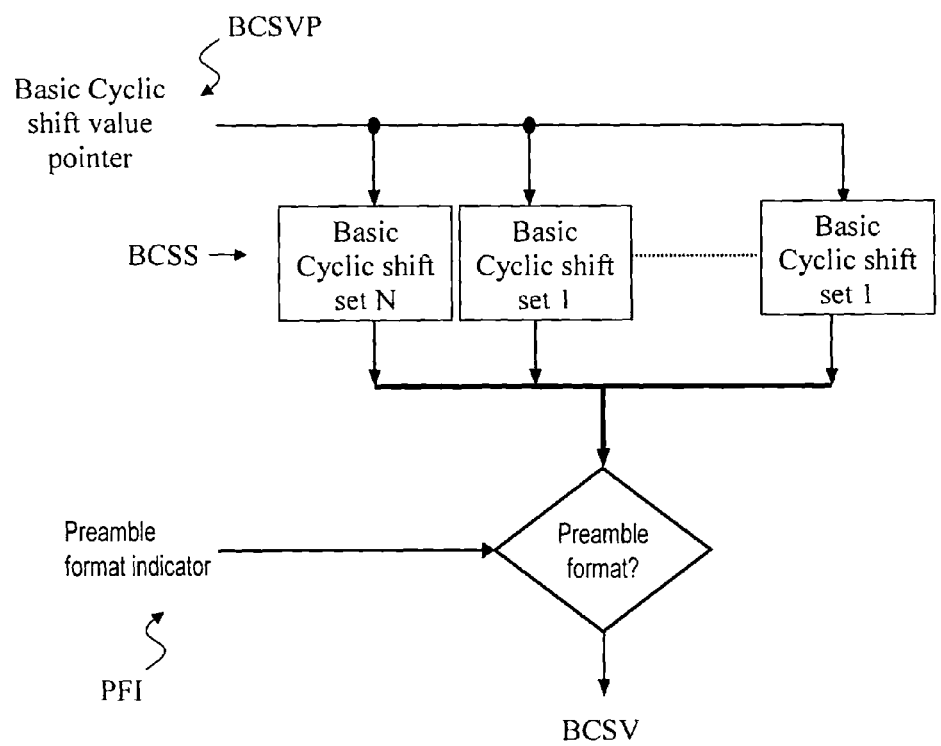
FIG. 2 shows a schematic flow chart of determining a basic cyclic shift value.

FIG. 2 shows a schematic illustration how to determine the basic cyclic shift length, denoted as basic cyclic shift value BCSV out of preamble format indicator PFI and basic cyclic shift value pointer BCSVP. The PFI indicates a basic cyclic shift set BCSS, a table, out of a plurality of sets, for example, for formats 0-3 a first table and a second table for format 4. The basic cyclic shift value BCSV is then determined based on the indicated table and the BCSVP.

Figure 3A:
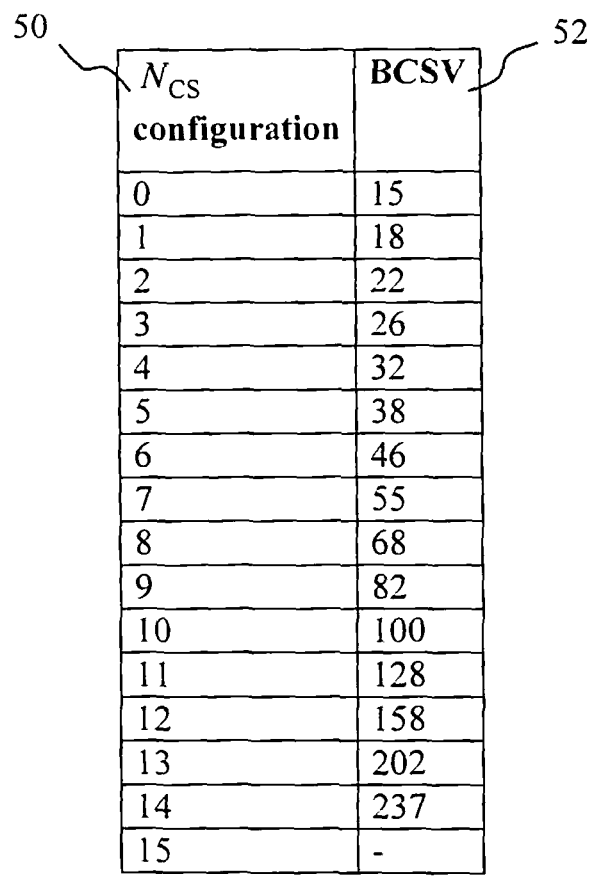
FIGS. 3a-3b show tables of basic cyclic shift values for different preamble formats.

In FIG. 3a, a table of basic cyclic shift values for preamble formats 0-3 is shown. In the first column 50 the Ncs configuration is indicated and in the second column 52 basic cyclic shift values BCSV are indicated.

Figure 3B:
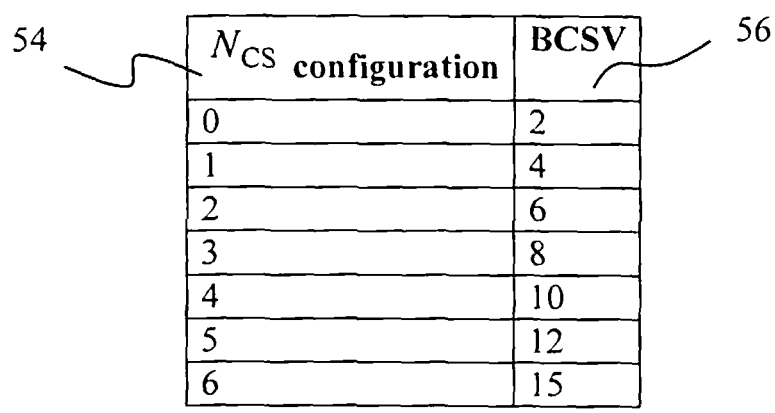

In FIG. 3b, a table of basic cyclic shift values for preamble format 4 is shown. In the first column 54 the Ncs configuration is indicated and in the second column 56 basic cyclic shift values BCSV are indicated. As seen, the BCSV are much smaller than in column 52 resulting in increased number of cyclic shifts of a root sequence.

Further, the size of the basic cyclic shift is chosen with respect to the expected cell size, and as mentioned above, also the size of the cyclic prefix as well as the size of the guard time needs to be chosen in accordance with the cell size. In embodiments, the size of the guard time and/or cyclic prefix associated with the preamble is then chosen as a function of the basic cyclic shift as well as the preamble format.

Figure 4:
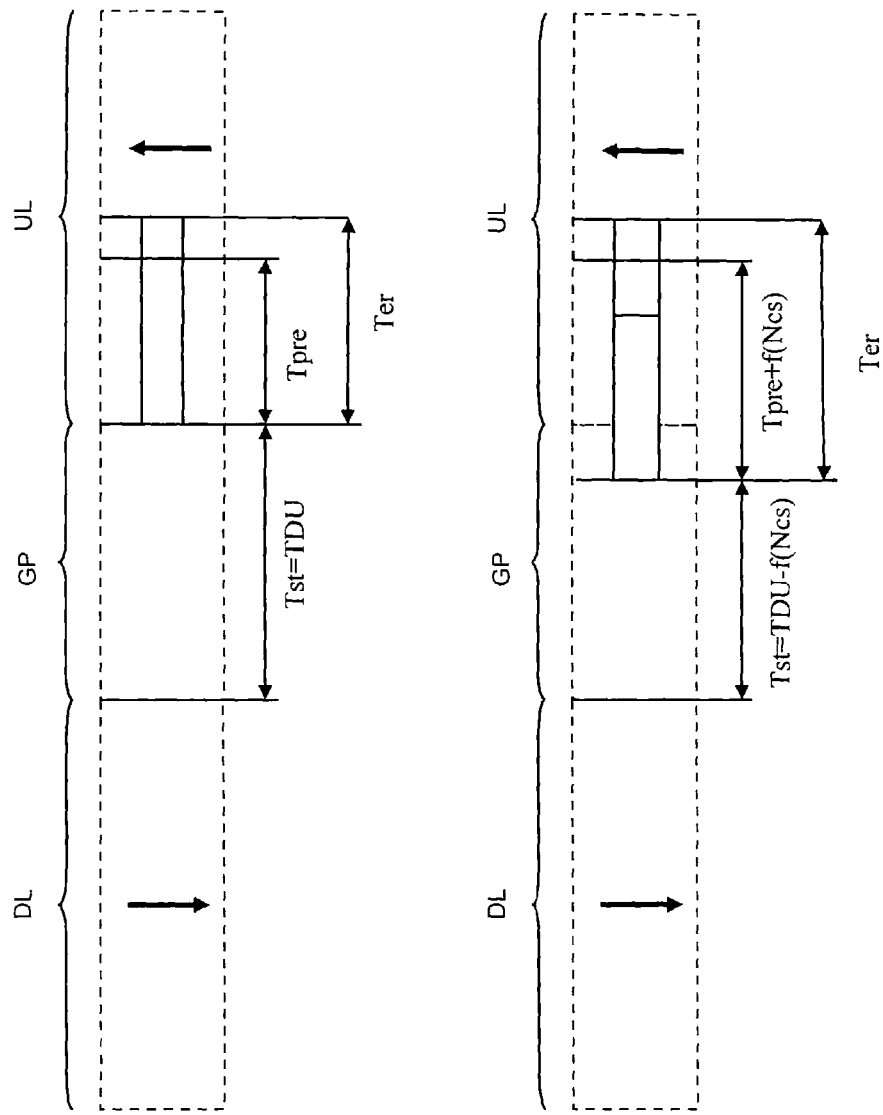
FIG. 4 shows schematically how a user equipment determines when to transmit a RA preamble.

In FIG. 4, it is shown that a UE determines the transmission of the RA preamble based only on the downlink DL. TDU is a time defining a guard period GP at the switch from DL to UL and transmission timing Tst is a time window defining the time when the UE starts RACH transmission after DL has ended. In the upper case Tst=TDU. In the lower case, the Tst is reduced with function of the basic cyclic shift value f(Ncs).

Ter is the length of a receiving window of an eNodeB. In the upper case, Ter may be up to Tpre+GT0, wherein Tpre is a time for a preamble length and GT0 is an initial guard time at the eNodeB. In the lower casem, the Ter is extended with a function of the basic shift value f(Ncs).

At the bottom, the UE determines the preamble transmission timing Tst also as a function of the size of the basic cyclic shift value. The larger the basic cyclic shift value, the earlier the terminal starts transmitting the RA preamble, and as a consequence the guard time increases.

One way to increase the guard time is to let the UE to start transmission of the RA preamble as a function of the basic cyclic shift value. The longer the basic cyclic shift, the earlier the UE starts the transmission of the RA preamble. One example is when the RA is to be received after a DL period. Recall that for TDD, there is a guard period GP at the transition from DL to UL, and even though there may be interference from, for example, base stations during the guard period GP, the last part of the guard period can be used to receive part of the RA burst. Thus, part of the guard period GP can be reused as guard time for RA reception Ter. In such a case, however, interference may allow only a small part of the guard period to be used, and this then limits how large the guard time can be made, and this in turn limits the size of the supported cells. The size of the guard time, or equivalently the transmission timing Tst of the RA preamble, is then determined as a function of the basic cyclic shift signaled to the terminal What FIG. 4 shows/assumes is that there is other UL data to be received, for example from UL shared channel transmissions that starts right after the eNodeb receiver window Ter. Note that the receiver window Ter has a length equal to the preamble length Tpre and guard time GT0 which accounts for the unknown Round-Trip Time, RTT. Hence, the "dotted preamble" illustrates the received signal at the eNodeB for the case that the RTT to the UE is zero. The unfilled part+the dotted preamble represent the total window in which a preamble could be received. IF the RTT equals the GT, then the signal received by the eNodeB is aligned at the end of the eNodeB receiver window.

The maximum RTT is thereby increased since the receive window Ter becomes larger.

Figure 5:
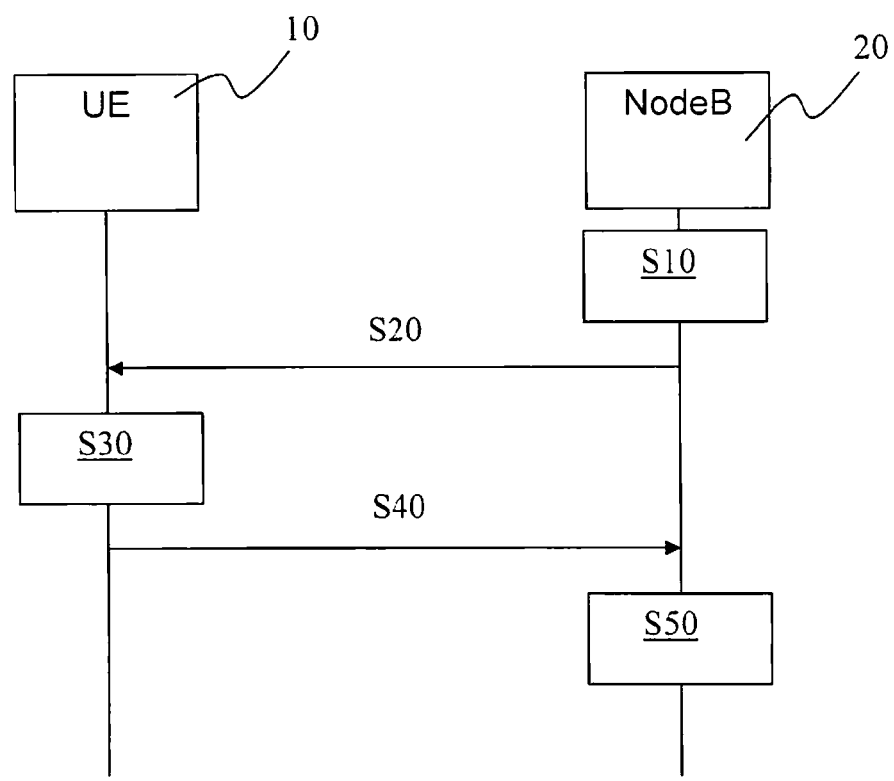
FIG. 5 shows a combined signalling and method diagram between a user equipment a NodeB.

In FIG. 5, an example of a combined signalling and method diagram for a user equipment UE 10 performing a random access procedure to a NodeB 20 is shown.

In step S10, the NobeB 10 determines a first preamble format to be used in a cell of the NodeB. The determination may be based on the cell size, the load on the network and/or the like. Furthermore, a basic cyclic shift length is determined from a table of basic cyclic shift values. The table is related to the determined first preamble format. The NodeB has consequently at least two tables to select from.

In step S20, the NodeB transmits data on a broadcast channel over the cell of the NodeB. The data comprises an indication of the determined preamble format and a basic cyclic shift value pointer pointing to the determined basic cyclic shift value in the selected table.

In step S30, the UE receives the data on the broadcast channel, decodes the data and retrieves the preamble format to use as well as the basic cyclic shift value pointer. The UE then determines basic cyclic shift value to use by reading the element indicated by the basic cyclic shift value pointer in the table related to the preamble format.

The UE then performs a random access procedure by using the preamble format and the basic cyclic shift value forming a random access request with a preamble sequence cyclically shifted according to the basic cyclic shift value.

In step S40, the random access request is transmitted to the NodeB.

In step S50, the random access request is received at the NodeB and the preamble sequence is processed in order to identify the UE to be able to respond to the UE.

Figure 6:
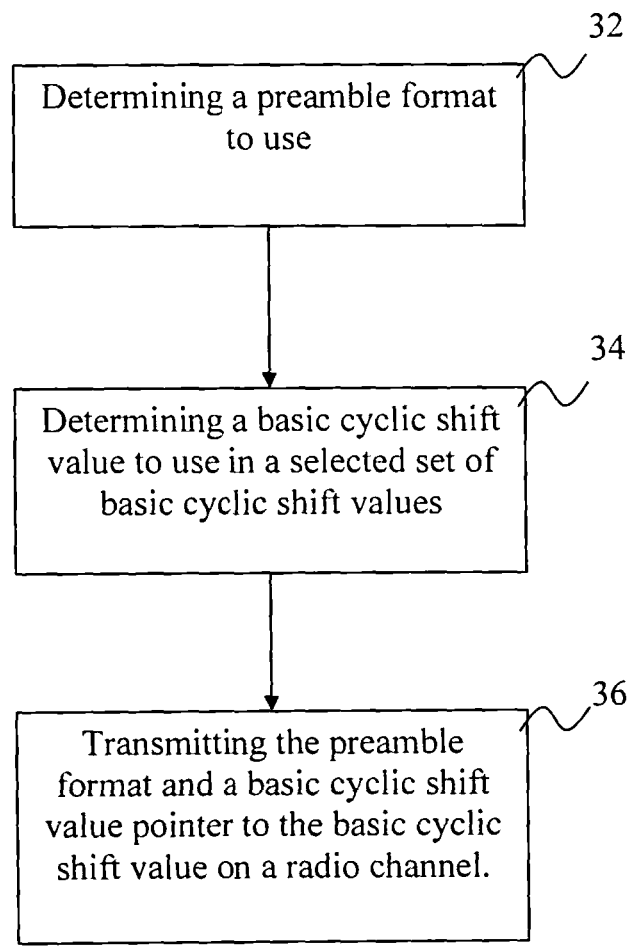
FIG. 6 shows a schematic flow chart of a method in a second communication device.

In FIG. 6, a schematic flow chart of a method in a second communication device is shown.

In step 32, the second communication device determines preamble format to use based on, for example, size of a cell of the second communication device and the like.

In step 34, the second communication device determines a basic cyclic shift length/value from a set of basic cyclic shift values; the set is selected based on the preamble format. The preamble format has a corresponding table of basic cyclic shift values stored on the second communication device, and the basic cyclic shift value is determined from a table corresponding to the preamble format. The basic cyclic shift value is determined based on, for example, cell size and/or the like.

In embodiments, the set selected is one set of at least two sets of basic cyclic shift values, each set relates to at least one preamble format.

Each set of basic cyclic shift values may correspond to a preamble format.

Data is created comprising an indication of the preamble format and a basic cyclic shift value pointer indicating the determined basic cyclic shift value in the set of basic cyclic shift values.

In step 36, the second communication device transmits the data over a radio channel over the cell. The radio channel may be a broadcast channel or the like.

During operation the second communication device may receive random access requests of the preamble format with a cyclically shifted root sequence according to the basic cyclic shift value.

In order to perform the method a second communication device is provided. The second communication device may be base station, such as a NodeB, eNodeB, RBS, combined RBS/RNC or the like.

Figure 7:
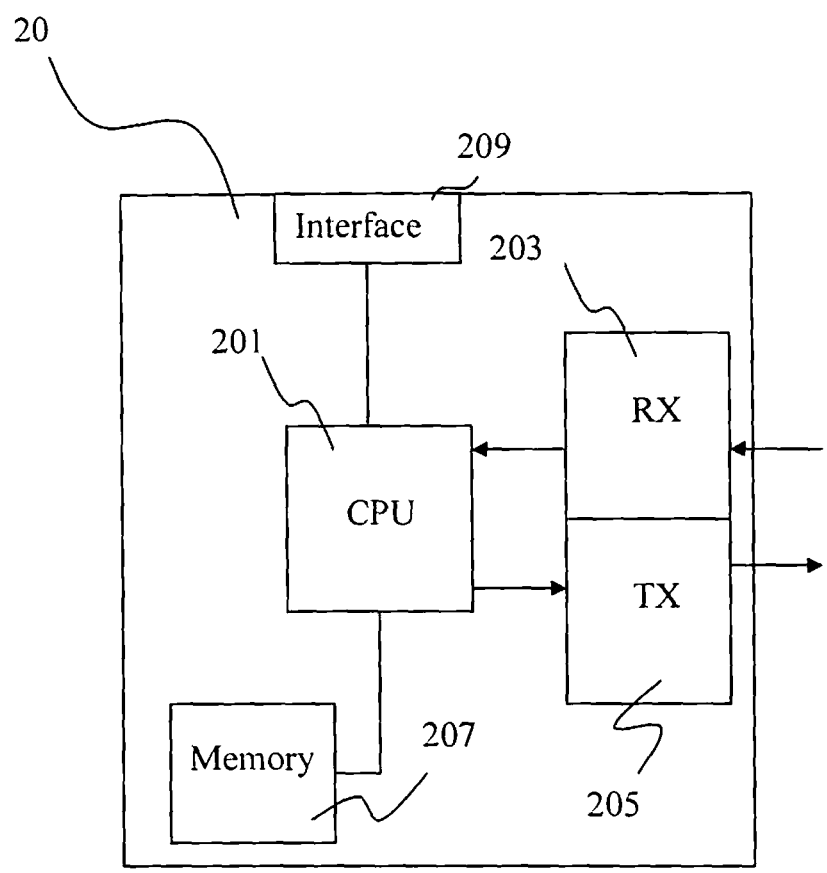
FIG. 7 shows a schematic overview of a second communication device.

In FIG. 7, a schematic overview of a second communication device 20 is shown.

The second communication device 20 comprises a control unit CPU 201 arranged to determine a first preamble format to be used in a cell of the second communication device 20 and to determine a basic cyclic shift value from a set of basic cyclic shift values, the set relates to the preamble format. The control unit 201 may be arranged to determine the first preamble format and the basic cyclic shift value based on the size of the cell, load on the network/cell and/or the like.

In some embodiments, each preamble format corresponds to a set of basic cyclic shift values.

The second communication device 20 further comprises a transmitting arrangement 205 adapted to transmit data comprising indication of the determined first preamble format and a basic cyclic shift value pointer indicating the basic cyclic shift length in the set of basic cyclic shift values. The data is transmitted over a radio channel, such as a broadcast channel or the like.

The second communication device 20 may further comprise a receiving arrangement 203 adapted to receive data from different communication devices, for example, a first communication device transmitting a random access request comprising a preamble sequence of the determined preamble format and cyclically shifted according to the basic cyclic shift value.

In the illustrated example, the second communication device 20 comprises a memory unit 207 arranged to have application/s installed thereon that when executed on the control unit 201 makes the control unit 201 to perform the method steps. Furthermore, the memory unit 207 may in some embodiments have data stored, such as tables of basic cyclic shift values and the like, thereon. The control unit 201 may then be arranged to select the basic cyclic shift value in the set of basic cyclic shift values, the set being one of at least two sets stored in the memory 207, wherein each set is related to different preamble formats.

The memory unit 207 may be a single unit or a number of memory units.

Furthermore, the second communication device 20 may comprise an interface 209 for communicating with a network.

Figure 8:
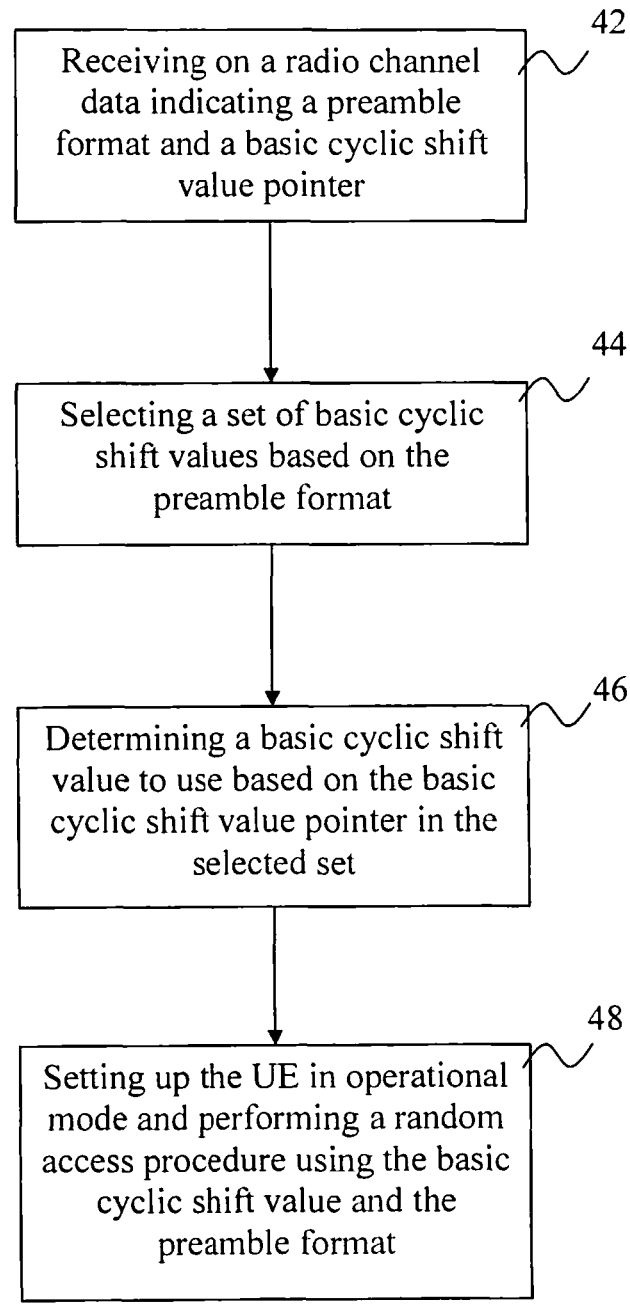
FIG. 8 shows a schematic flow chart of a method in a first communication device.

In FIG. 8, a schematic flow chart of a method in a first communication device is shown.

In step 42, the first communication device receives data on a radio channel, such as a broadcast channel or the like, from a second communication device indicating a preamble format and comprising a basic cyclic shift value pointer.

The first communication device decodes the data and retrieves, for example, the preamble format and the basic cyclic shift value pointer.

In step 44, the first communication device selects a set of basic cyclic shift values based on the preamble format. The first communication device may have a plurality of tables related to different preamble formats. In an example, the first communication device has a first table of basic cyclic shift values for preamble formats 0-3 and a second table of basic cyclic shift values for preamble format 4, wherein the set to select from is based on the determined preamble format.

In some embodiments, each preamble format corresponds to a set of basic cyclic shift values.

The received data may comprise bits indicating the basic cyclic shift length, wherein the bits are the basic cyclic shift value pointer in the table and the preamble format indicates which table to use.

In step 46, the first communication device determines a basic cyclic shift value to use based on the basic cyclic shift value pointer in the selected set.

In optional step 48, the first communication device is set up in an operational mode and in order to access a network the first communication device performs a random access procedure using the basic cyclic shift value and the preamble format. Hence, a random access request is generated of the preamble format with a cyclically shifted root sequence according to the basic cyclic shift value and transmitted to the second communication device requesting access to the network.

The random access procedure may comprise a preamble containing a guard time and/or a cyclic prefix, wherein the cyclic prefix and/or the guard time is determined as a function of the basic cyclic shift value.

In order to perform the method steps a first communication device is provided. The first communication device may be a user equipment, such as a mobile phone, a PDA, or the like.

Figure 9:
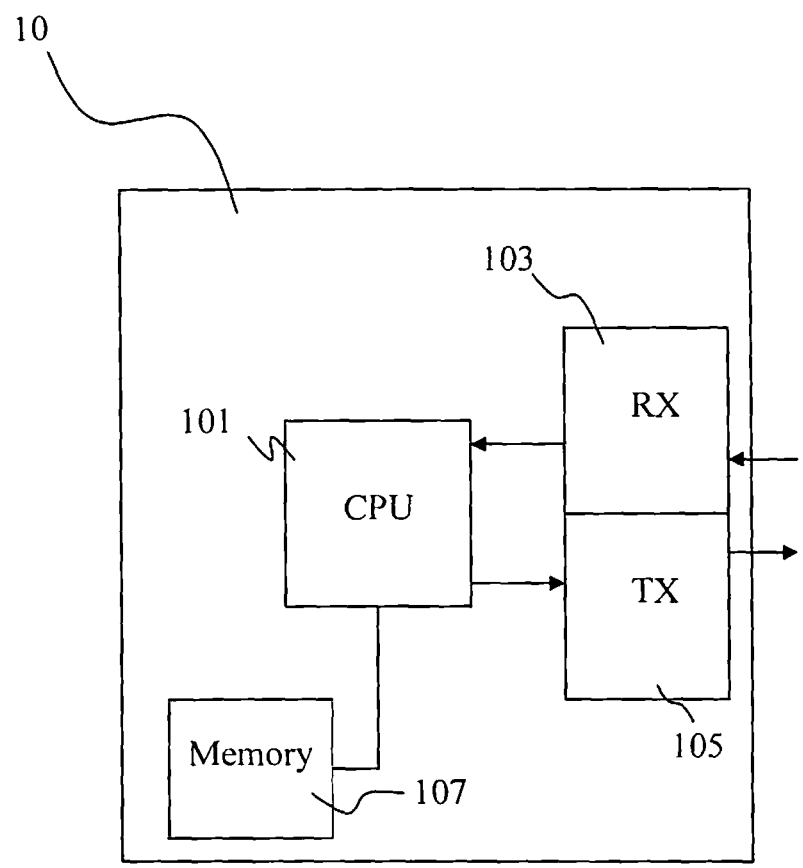
FIG. 9 shows a schematic overview of a first communication device.

In FIG. 9 a schematic overview of a first communication device 10 is shown.

The first communication device 10 comprises a receiving arrangement 103 adapted to receive data over a radio channel, such as a broadcast channel or the like, from a second communication device. The data comprises an indication of a first preamble format to use and a basic cyclic shift value pointer indicating the basic cyclic shift value in a set of basic cyclic shift values to use. The first communication device 10 further comprises a control unit 101 arranged to decode the data to obtain the indication of preamble format and the basic cyclic shift value pointer. The preamble format is used to select a set of at least two sets and the basic cyclic shift pointer is used to determine the basic cyclic shift value. The first communication device 10 is then set up in an operational mode adjusted to use the preamble format and the basic cyclic shift value.

The control unit 101 may in some embodiments additionally be arranged to perform a random access process in order to access a network. In the random access process the control unit 101 uses the preamble format and the basic cyclic shift value and transmits the connection request using a transmitting arrangement 105. Hence, the request is of the preamble format with a cyclically shifted root sequence according to the basic cyclic shift value.

The first communication device 10 may in some embodiments further contain a memory arrangement 107, comprising a single memory unit or a number of memory units. Applications, arranged to be executed on the control unit 101 to perform the method steps, may be stored on the memory arrangement 107 as well as RA configurations data, such as, preamble format, basic cyclic shift values and the like. Furthermore, the memory unit 107 may in some embodiments have data stored, such as tables of basic cyclic shift values and the like, thereon. The control unit (101) may then be arranged to select the basic cyclic shift value in the set of basic cyclic shift values based on the basic cyclic shift value pointer, the set being one of at least two sets stored in the memory (207), wherein each set is related to different preamble formats.

It should be understood that the receiving and transmitting arrangements in the communication devices may be separated devices or a combined device such as a transceiving unit.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method in a base station for transmitting data on a radio channel comprising the steps of:
    determining a first preamble format to be used by a terminal in a cell of the base station,
    selecting a cyclic shift value set from among a plurality of cyclic shift value sets based on the first preamble format, wherein each of the cyclic shift value sets comprises a plurality of cyclic shift values,
    selecting a basic cyclic shift value from within the selected cyclic shift value set,
    determining a basic cyclic shift value pointer that identifiers the selected basic shift value within the selected cyclic shift value set, and
    transmitting, to the terminal, data comprising an indication of the determined first preamble format and the basic cyclic shift value pointer, wherein the step of determining the basic cyclic shift value comprises to select a basic cyclic shift value from the set of basic cyclic shift values, and wherein the set is one set of at least two sets of basic cyclic shift values, wherein each set is related to different preamble formats.

2. The method of claim 1 wherein the steps of determining the first preamble format and the basic cyclic shift value is based on the size of the cell.

3. The method of claim 1 wherein each preamble format corresponds to a set of basic cyclic shift values.

4. The method of claim 1 wherein the data is transmitted on a broadcast channel.

5. A base station comprising:
a control unit arranged to:
determine a first preamble format to be used by a terminal in a cell of the base station;
select a cyclic shift value set from among a plurality of cyclic shift value sets based on the first preamble format, wherein each of the cyclic shift value sets comprises a plurality of cyclic shift values; and
select a basic cyclic shift value from within the selected cyclic shift value set; and a transmitting arrangement adapted to transmit to the terminal data comprising an indication of the determined first preamble format and the basic cyclic shift value pointer,
further comprising;
a memory, wherein the control unit is arranged to select the basic cyclic shift value in the set of basic cyclic shift values, the set being one of at least two sets stored in the memory, wherein each set is related to different preamble formats.

6. The base station of claim 5, further comprising a receiving arrangement adapted to receive random access data from a user equipment, wherein the control unit is arranged to process the received data.

7. The base station of claim 5, wherein the transmitting arrangement is adapted to transmit data on a broadcast channel.

8. A method in a user equipment for processing a signal comprising the steps of:
receiving data from a base station on a radio channel, the data comprises an indication of preamble format and a basic cyclic shift value pointer indicating, from among a plurality of basic cyclic shift values within a selected cyclic shift value set, a basic cyclic shift value to be used in a random access procedure,
determining the preamble format from the received data,
determining, from among a plurality of cyclic shift value sets, a cyclic shift value set associated with the determined preamble format, wherein each of the cyclic shift value sets comprises a plurality of cyclic shift values, and
selecting a basic cyclic shift value from within the determined cyclic shift value set based on the basic cyclic shift value pointer,
wherein the step of selecting the basic cyclic shift value comprises to select a basic cyclic shift value from a set of basic cyclic shift values of at least two sets of basic cyclic shift values, wherein the set to select from is based on the determined preamble format.

9. The method of claim 8, wherein the method further comprises a step of setting up the user equipment in an operational mode to perform a random access procedure using the determined preamble format and a preamble sequence that is cyclically shifted using a cyclic shift value that is based upon the determined basic cyclic shift value.

10. The method of claim 8, wherein each preamble format corresponds to a set of basic cyclic shift values.

11. The method of claim 8, wherein the set of basic cyclic shift values is a table of basic cyclic shift values and the received data comprises bits indicating the basic cyclic shift value, wherein the bits are the basic cyclic shift value pointer in the table and the preamble format indicates which table to use.

12. The method of claim 8, wherein the random access procedure comprises a preamble containing a guard time and/or a cyclic prefix, wherein the cyclic prefix and/or the guard time is determined as a function of the basic cyclic shift value.

13. The method of claim 8, wherein the data is received on a broadcast channel.

14. A user equipment comprising:
a receiving arrangement adapted to receive data comprising a basic cyclic shift value pointer indicating, from among a plurality of basic cyclic shift values within a selected cyclic shift value set, a basic cyclic shift value to be used in a random access procedure and an indication of a first preamble format from base station on a radio channel; and
a control unit arranged to:
determine a preamble format to be used in a random access procedure from the indication in the received data;
determine, from among a plurality of cyclic shift value sets, a cyclic shift value set associated with the determined preamble format, wherein each of the cyclic shift value sets comprises a plurality of cyclic shift values; and
select a basic cyclic shift value from within the determined cyclic shift value set based on the basic cyclic shift value pointer,
further comprising
a memory, wherein the control unit is arranged to select the basic cyclic shift value in the set of basic cyclic shift values, the set being one of at least two sets stored in the memory, wherein each set is related to different preamble formats.

15. The user equipment of claim 14, wherein the control unit is further arranged to perform a random access procedure using the determined preamble format and a preamble sequence that is cyclically shifted in accordance with the selected basic cyclic shift value.

16. The user equipment of claim 15, further comprising a transmitting arrangement adapted to transmit the preamble sequence to the base station.

17. The user equipment of claim 14, wherein the receiving arrangement is adapted to receive data on a broadcast channel.

* * * * *